United States Patent
Hou et al.

(10) Patent No.: US 9,739,889 B2
(45) Date of Patent: Aug. 22, 2017

(54) METHOD OF DIVIDING SATELLITE SIGNAL INTO EIGHT FREQUENCY POINTS FOR PROCESSING

(71) Applicant: SHANGHAI HUACE NAVIGATION TECHNOLOGY LTD., Shanghai (CN)

(72) Inventors: Yongtao Hou, Shanghai (CN); Xiaofei Zhang, Shanghai (CN); Xianghui Che, Shanghai (CN)

(73) Assignee: SHANGHAI HUACE NAVIGATION TECHNOLOGY LTD., Shanghai (CN)

(*) Notice: Subject to any disclaimer, the term of this patent is extended or adjusted under 35 U.S.C. 154(b) by 0 days.

(21) Appl. No.: 15/305,352

(22) PCT Filed: Sep. 2, 2015

(86) PCT No.: PCT/CN2015/088918
§ 371 (c)(1),
(2) Date: Oct. 20, 2016

(87) PCT Pub. No.: WO2016/101651
PCT Pub. Date: Jun. 30, 2016

(65) Prior Publication Data
US 2017/0038473 A1   Feb. 9, 2017

(30) Foreign Application Priority Data
Dec. 26, 2014  (CN) .......................... 2014 1 0855750

(51) Int. Cl.
*G01S 19/32*   (2010.01)
*G01S 19/33*   (2010.01)
(Continued)

(52) U.S. Cl.
CPC .............. *G01S 19/32* (2013.01); *G01S 19/33* (2013.01); *G01S 19/421* (2013.01); *G01S 19/09* (2013.01); *G01S 19/30* (2013.01); *G01S 19/34* (2013.01)

(58) Field of Classification Search
CPC .......... G01S 19/32; G01S 19/33; G01S 19/05; G01S 19/258; G01S 19/38; G01S 19/09;
(Continued)

(56) References Cited

U.S. PATENT DOCUMENTS 8,582,693 B2 *  11/2013  Tan ...................... H04B 1/0075
                                                              342/350
8,874,063 B2 *  10/2014  Ko ........................... H04B 1/16
                                                              455/255

(Continued)

FOREIGN PATENT DOCUMENTS

CN          101198160 A     6/2008
CN          201707440 U     1/2011
(Continued)

*Primary Examiner* — Chuong P Nguyen
(74) *Attorney, Agent, or Firm* — Gokalp Bayramoglu

(57) ABSTRACT

A method of dividing a satellite signal into eight frequency points for processing includes the following steps: amplifying a satellite signal received by an antenna (S1); dividing the amplified satellite signal into radio frequency signals that includes eight frequency points in total, GPSL1, GPSL2, GPSL5, BDB1, BDB2, BDB3, GLNL1, and GLNL2, by a power divider circuit (S2); conducting a frequency mixing processing on five signals GPSL2, CPSL5, BDB2, BDB3, and GLNL2, and filtering the radio frequency signals that include eight frequency points in total, which include five frequency-mixed signals, GPSL2, GPSL5, BDB2, BDB3, and GLNL2, and three unmixed signals, GPS1, BDB1, and GN1 (S3); down-converting and A/D converting filtered eight-frequency-point radio frequency signals, outputting the signals to a baseband portion for a baseband signal (Continued)

processing (S4). This method reduces the power consumption, the size and the cost of the hardware.

18 Claims, 2 Drawing Sheets

(51) Int. Cl.
 *G01S 19/42* (2010.01)
 *G01S 19/09* (2010.01)
 *G01S 19/34* (2010.01)
 *G01S 19/30* (2010.01)

(58) Field of Classification Search
 CPC .......... G01S 19/37; G01S 19/27; G01S 19/24; G01S 19/30; G01S 19/29; G01S 19/34; G01S 19/35; G01S 19/36
 USPC ............ 342/357.42, 357.21, 357.46, 357.66, 342/357.69, 357.72, 357.74, 342/357.76–357.78
 See application file for complete search history.

(56) References Cited

U.S. PATENT DOCUMENTS

| | | | |
|---|---|---|---|
| 9,482,760 B2 * | 11/2016 | Lennen | G01S 19/33 |
| 2010/0097531 A1 * | 4/2010 | Miura | H04B 1/30 348/735 |
| 2011/0115672 A1 | 5/2011 | Lee | |
| 2015/0133070 A1 * | 5/2015 | Huang | H04B 1/005 455/326 |
| 2016/0011317 A1 * | 1/2016 | Lennen | G01S 19/34 342/357.74 |
| 2016/0195620 A1 * | 7/2016 | Liu | G01S 19/36 342/357.72 |
| 2017/0010362 A1 * | 1/2017 | Tomiyama | G01S 19/33 |

FOREIGN PATENT DOCUMENTS

| | | |
|---|---|---|
| CN | 101978285 A | 2/2011 |
| CN | 102096079 A | 6/2011 |
| CN | 103117767 A | 5/2013 |
| CN | 103412317 A | 11/2013 |
| CN | 203535230 U | 4/2014 |
| CN | 103885072 A | 6/2014 |
| CN | 204405846 U | 6/2015 |

\* cited by examiner

METHOD OF DIVIDING SATELLITE SIGNAL INTO EIGHT FREQUENCY POINTS FOR PROCESSING

CROSS REFERENCE TO RELATED APPLICATIONS

This application is a national phase entry and claims the priority of International Application No. PCT/CN2015/088918, filed on Sep. 2, 2015. Which is based upon and claims priority to Chinese Patent Application No. 201410855750.7, filed on Dec. 26, 2014, The entire contents of which are incorporated herein by reference.

TECHNICAL FIELD

The present invention relates to the technical field of satellite navigation, particularly relates to a method of dividing a satellite signal into eight frequency points for processing.

BACKGROUND

With the development of the construction of Beidou (BD) satellite navigation system network, the BD navigation satellite system provided formal regional service since 2012. The BD navigation satellite system can be compatible with the GPS (global position system) of the US, the GLONASS (Global Navigation Satellite System) of Russia, the Galileo System of European Union, and other satellite navigation systems in the world, and can provide highly precise, reliable positioning, navigating, timing service for various users all-weather, all day around, and all around the world.

However, most of the baseband portion of the receivers with satellite navigation can only receive and process one of or the combination of several frequency-point signals of the B1 of the BD-2, the 1 of the GPS, and the 1 of the GONASS. Seldom can they receive or process eight frequency points of the satellite signals, i.e. GPS 1/2/5, GLONASS 1/2 and BD B1C/B2C/B3C simultaneously. As a result the number of available frequency points is low. For the occasion of original observation type like differential positioning etc. which needs more frequency points, the differential solution requires at least the original observation of two or more frequency point types of signals. Obviously, in this case, the old method can not adapt to the current development.

The present method of processing the eight-frequency-point satellite signal is complicated in structure, which uses a lot of input interfaces, amplifiers, local oscillator circuits, and frequency mixer circuits. Using a large number of circuits remarkably enlarges the size of the PCB, which is disadvantageous for minimizing the satellite positioning receiver, and increases the power consumption of the satellite receiver, at the same time, increases the cost of the hardware. Accordingly, it is difficult to realize receiving the eight-frequency-point satellite signal.

SUMMARY

In view of the current deficiencies in the technical field of satellite navigation as described above, the present invention provides a method of dividing a satellite signal into eight frequency points for processing, which can receive and process the signals of eight frequency points, i.e. GPS 1/2/5, GLONASS 1/2, and BD B1C/B2C/B3C. The power consumption is reduced, and the cost and the size of the hardware are reduced.

In order to achieve the above purpose, the embodiments of the invention use the technical solutions as following:

A method of dividing a satellite signal into eight frequency points for processing, wherein the method of dividing a satellite signal into eight frequency points for processing comprises following steps:

amplifying a satellite signal received by an antenna;

dividing the amplified satellite signal into the radio frequency signals that includes eight frequency points in total, GPSL1, GPSL2, GPSL5, BDB1, BDB2, BDB3, GLNL1 and GLNL2 by a power divider circuit;

conducting a frequency mixing processing on GPSL2, GPSL5, BDB2, BDB3, and GLNL2 undergo frequency mixing, then filtering the radio frequency signals that include eight frequency points in total, which include the five frequency-mixed signals GPSL2, GPSL5, BDB2, BDB3 and GLNL2, and three unmixed signals GPSL1, BDB1, and GLNL1;

down-converting and A/D converting filtered eight-frequency-point radio frequency signals, outputting the signals to a baseband portion for a baseband signal processing.

According to one aspect of the invention, the baseband signal processing includes: capturing, tractioning, tracking, synchronizing and demodulating, and observation extracting, after reading a relevant value from a baseband.

According to one aspect of the invention, the capturing specifically can be: fast capturing the satellite signal using a method based on matched filtering and FFT, so as to obtain a code phase and Doppler information under a large-scale uncertainty.

According to one aspect of the invention, the traction specifically can be: if the capturing is confirmed successfully, conducting a dynamic-range tractioning on the code phase and the carrier frequency using the code loop and the frequency-locked loop.

According to one aspect of the invention, the tracing specifically can be: after the tractioning is successful, and the phase-locking and the frequency-locking are: conducted successfully, tracking the code phase and the carrier frequency using the code loop and the phase-locked loop with a proper bandwidth.

According to one aspect of the invention, the synchronization and. demodulation specifically can be: conducting the bit synchronizing, and demodulating a bit stream of text data; wherein a GPS satellite and a BD-2 GEO satellite are synchronized using a histogram; wherein since a BD-2 MEO/IGSO has NH code, the BD-2 MEO/IGSO is synchronized using a method of matched filtering, so as to transform the bit stream into a frame.

According to one aspect of the invention, the observation extraction specifically can be: alter the synchronizing and the demodulating are successful, decoding a navigation text to obtain ephemeris and almanac information; wherein a position, a velocity information, and parameters of a satellite used for a navigation positioning solution are obtained from the ephemeris and the almanac.

According to one aspect of the invention, dividing the amplified satellite signals into radio frequency signals that includes eight frequency points in total GPSL1, GPSL2, GPSL5, BDB1, BDB2, BDB3, GLNL1 and GLNL2 by the power divider circuit, specifically is: dividing the amplified satellite signals into eight-frequency-point radio frequency signals that include eight frequency points in total GPSL1, GPSL2, GPSL5, BDB1, BDB2, BDB3, GLNL1 and GLNL2 through a first-stage power divider and a second-stage power divider.

According to one aspect of the invention, a specific implementation of the conducting a frequency mixing processing on the five signals, GPSL2, GPSL5, BDB2, BDB3 and GLNL2 can be: outputting two carrier signals through a local oscillator circuit, then power dividing the two local oscillator signals into five signals be frequency-mixed with the five signals including GPSL2, GPSL5, BDB2, BDB3 and GLNL2 by a frequency mixer.

According to one aspect of the invention, the down-converting and the A/D converting the filtered eight-frequency-point radio frequency specifically can be: down-converting the filtered eight-frequency-point signals into frequency signals that are suitable for the baseband processing, then conducting A/D conversion to quantize down-converted analog satellite signals into digital signals.

The advantages of the implementations of the invention: the method of dividing a satellite signal into eight frequency points for processing according to the invention, divides the amplified satellite signal into radio frequency signals that include eight frequency points in total, i.e. GPSL1, GPSL2, GPSL5, BDB1, BDB2, BDB3, GLNL1 and GLNL2 by the power divider circuit. The five signals, i.e. GPSL2, GPSL5, BDB2, BDB3, and GLNL2, undergo the frequency mixing processing. The radio frequency signals that include eight frequency points in total, i.e. the five frequency-mixed signals including GPSL2, GPSL5, BDB2, BDB3 and GLNL2, and the three unmixed signals including GPSL1, BDB1, and GLNL1, are filtered. Finally, the filtered eight-frequency-point signals are down converted and A/D converted, and then are output to the baseband portion for the baseband signal processing. The GPSL2, GPSL5, BDB2, BDB3 and GLNL2 are low-frequency signals, which are frequency-mixed using the low local oscillator circuit to obtain the signal of 1550 MHz~1611 MHz, and are frequency-balanced with the three signals, i.e. GPSL1, BDB1 and GLNL1. A plurality of frequency mixer circuits, a plurality of local oscillator circuits, and a plurality of input amplifier circuits are saved. The difficulty of realizing the eight-frequency-point satellite positioning receiver of three systems BD+GPS+GLONASS is significantly reduced. The power consumption is reduced. The cost and the size of the hardware are cut down.

BRIEF DESCRIPTION OF THE DRAWINGS

In order to describe the technical solution of the embodiment of the invention more Clearly, hereinafter, the figures used in the embodiments are briefly introduced. The figures described below are only some embodiments of the invention. For the person with ordinary skill in the art, other variations according to these figures can be obtained without creative work as well.

DETAILED DESCRIPTION

Hereinafter, the technical solution of the embodiment of the invention is clearly, completely described with reference to the drawings of the embodiment of the invention. Obviously, the described embodiments are only some of embodiments of the invention, but not all of the embodiments. Based on the embodiment of the invention, any other embodiments obtained by the person of ordinary skill in the art without creative work, all fall within the protection scope of the invention.

Figure 1:
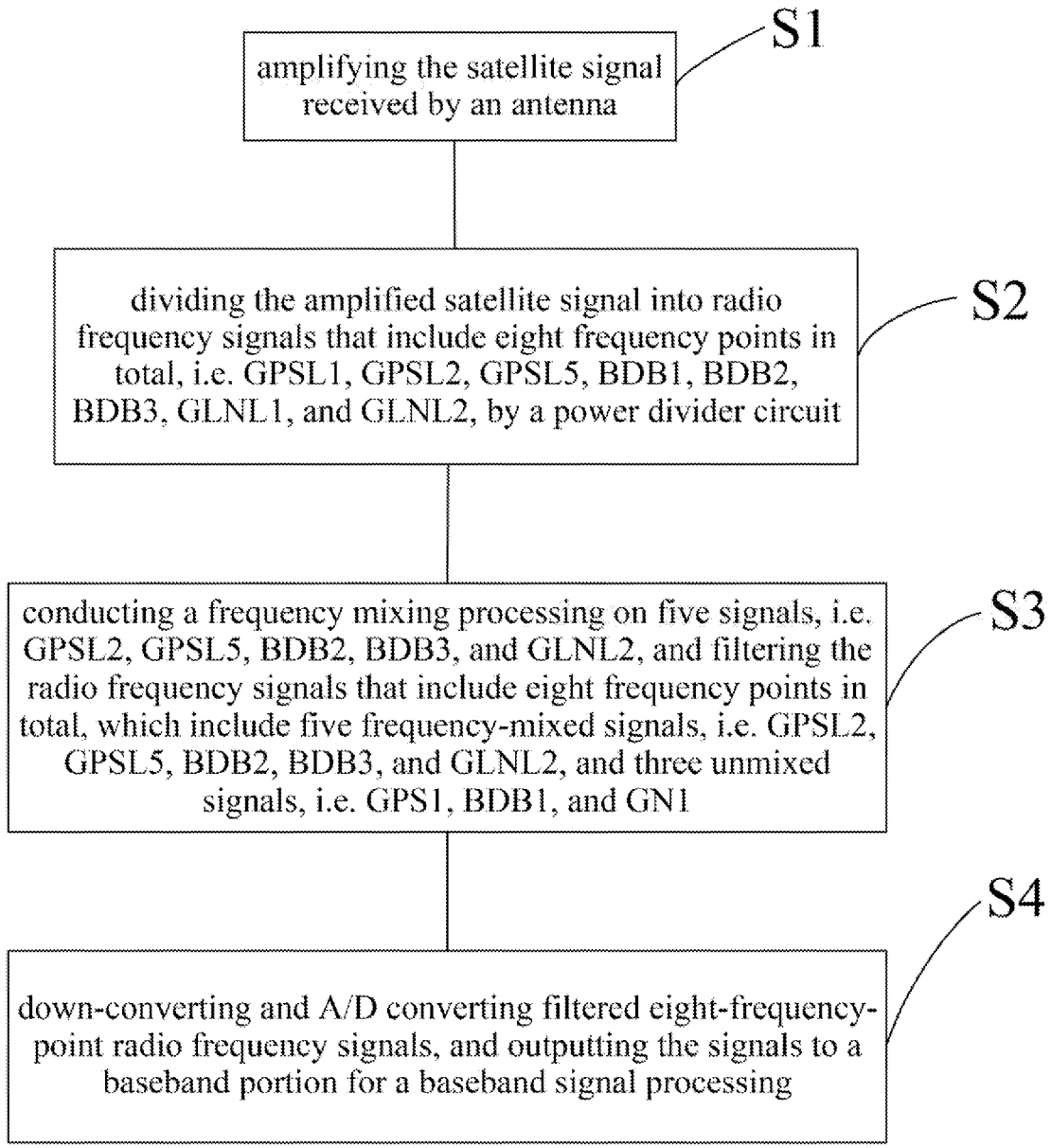
FIG. 1 is a flow chart of a method of dividing a satellite signal into eight frequency points for processing according to the invention.
Figure 2:
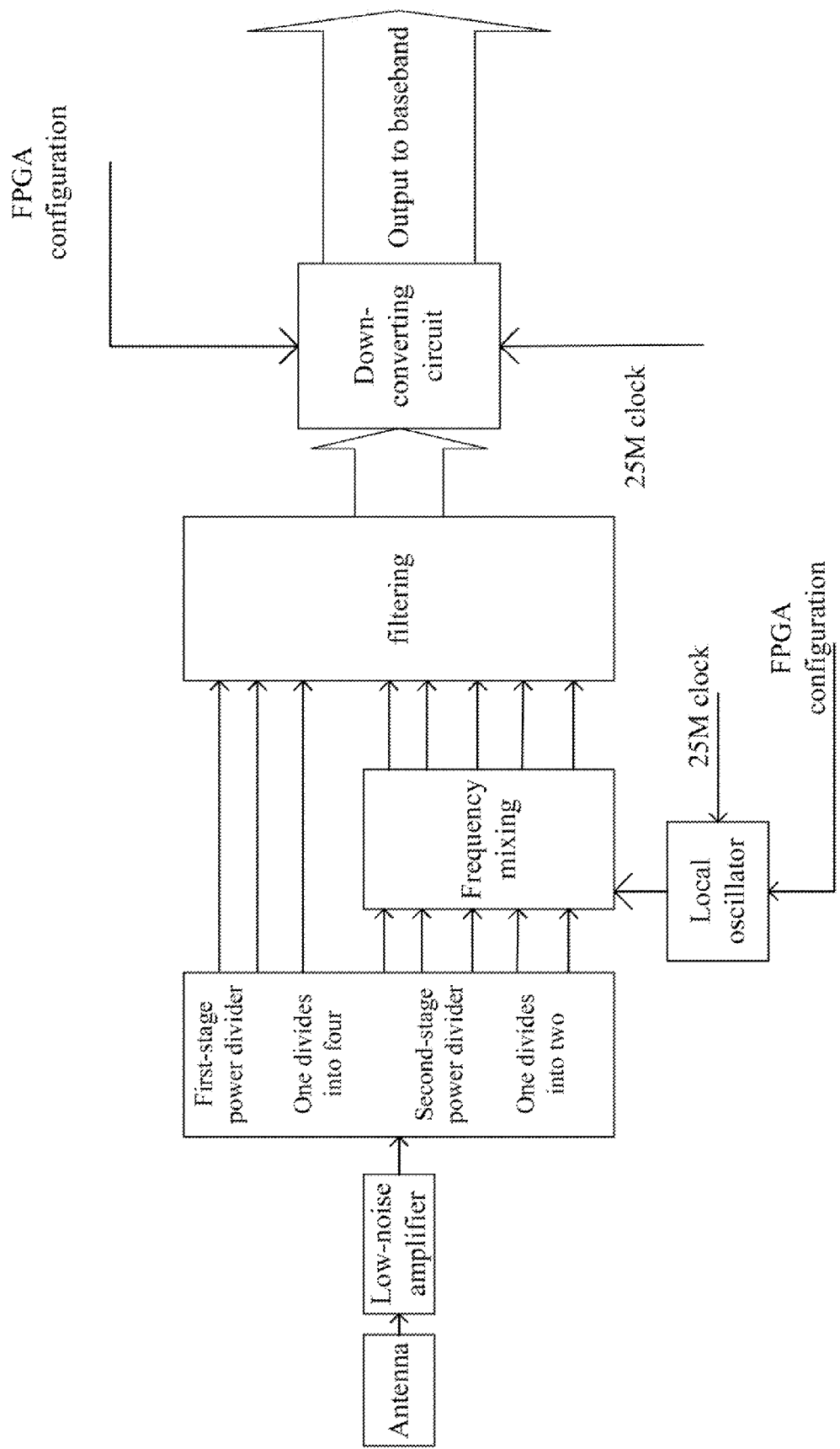
FIG. 2 is a block diagram of the circuit implementing the method of dividing a satellite signal into eight frequency points for processing according to the invention.

As shown in FIG. 1 and FIG. 2, a method of dividing a satellite signal into eight frequency points for processing, the method of dividing a satellite signal into eight frequency points for processing includes the following steps:

Step S1: the satellite signal received by an antenna is amplified;

The specific implementation of step S1 in which the satellite signal received by an antenna is amplified can be: the analog satellite navigation signal enters a receiver through the antenna. Then, the analog satellite navigation signal enters a low-noise amplifier. The amplifier amplifies the received signal.

In practical application, the antenna is capable of receiving the satellite navigation signals of three systems.

Step S2: the amplified satellite signal is divided into the radio frequency signals that include eight frequency points in total i.e. GPSL1, GPSL2, GPSL5, BDB1, BDB2, BDB3, GLNL1, and GLNL2, by a power divider circuit;

The specific implementation of step S2 in which the amplified satellite signal is divided into the radio frequency signals that include eight frequency points in total, i.e. GPSL1, GPSL2, GPSL5, BDB1, BDB2, BDB3, GLNL1, and GLNL2, by a power divider circuit is: the analog satellite navigation signal is amplified in step S1 and is divided into the radio frequency signals that include eight frequency points in total, i.e. GPSL1, GPSL2, GPSL5, BDB1, BDB2, BDB3, GLNL1, and GLNL2, through the first-stage power divider and the second-stage power divider.

Step S3: the five signals GPSL2, GPSL5, BDB2, BDB3, and GLNL2 undergo the frequency mixing processing. The radio frequency signals that include eight frequency points in total, i.e the five signals after the frequency mixing processing including GPSL2, GPSL5, BDB2, BDB3 and GLNL2, and the three unmixed signals including GPSL1, BDB1, and GLNL1, are filtered;

The specific implementation of step S3 in which the five signals GPSL2, GPSL5, BDB2, BDB3, and GLNL2 undergo the frequency mixing processing, and then the radio frequency signals that include eight frequency points in total, i.e. the five signals after the frequency mixing processing including GPSL2, GPSL5, BDB2, BDB3, and GLNL2 and the three unmixed signals including GPSL1, BDB1, and GLNL1, are filtered is: the five signals including GPSL2, GPSL5, BDB2, BDB3, and GLNL2 obtained after the processing of step S2 undergo the frequency mixing processing via a frequency mixer circuit. Specifically, two carrier signals are output through a local oscillator circuit respectively. The two local oscillator signals are power-divided into five signals to be frequency-mixed with the five signals including GPSL2, GPSL5, BDB2, BDB3, and GLNL2 by the frequency mixer. Next, the radio frequency signals that include eight frequency points, i.e. the five frequency-mixed signals including GPSL2, GPSL5, BDB2, BDB3, and GLNL2, and the three unmixed signals i.e. GPSL1, BDB1, and GLNL1, are filtered.

The frequency mixer circuit includes two portions, the local oscillator circuit, and the mixer. Two carrier signals output by the local oscillator circuit is 330M and 390M respectively. The local oscillator signals are power-divided into five signals, to be frequency-mixed with the five satellite signals GPSL2, GPSL5, BDB2, BDB3 and GLNL2 through the frequency mixer. The frequencies of the carrier signals before and after the frequency mixing are as shown in the following table.

TABLE 1

| Frequency point | Before frequency mixing | After frequency mixing |
| --- | --- | --- |
| GPSL5 | 1176.45 MHz | 1566.45 MHz |
| GPSL2 | 1227.6 MHz | 1557.6 MHz |
| BDB2 | 1207.14 MHz | 1597.14 MHz |
| BDB3 | 1268.52 MHz | 1598.52 MHz |
| GLNL2 | 12465 MHz | 1576 MHz |

In practical application, in order to improve the precision of pseudo-range measurement when the baseband processing portion uses the narrow correlation, a relatively wide bandwidth is used in the filter here.

Step S4: the filtered eight-frequency-point radio signals are down converted and A/D converted, and then are output to a baseband portion for the baseband signal processing.

The specific implementation of step S4 in which the filtered eight-frequency-point radio signals are down converted and A/D converted, and then are output to a baseband portion for the baseband signal processing is: the filtered eight-frequency-point radio signals are down converted into the frequency signals that are suitable for the baseband processing. Next, the A/D conversion is conducted such that the down-converted analog satellite signals are quantized into digital signals. Then, the baseband signal processing is concocted by the baseband signal processing circuit.

In practical application, the baseband signal processing includes: the capturing, the tractioning, the tracking, the synchronizing and demodulating, and the observation extracting, after reading the relevant value from the baseband.

The capturing specifically can be: fast capturing the satellite signal using the method based on matched filtering and FFT, so as to obtain the code phase and Doppler information under a large-scale uncertainty.

The tractioning specifically can be: if the capturing is confirmed successfully, conducting the dynamic-range tractioning on the code phase and the carrier frequency using the code loop and the frequency-locked loop.

The tracking specifically can be: after the tractioning is successful, and the phase-locking and the frequency-locking are conducted successfully, tracking the code phase and the carrier frequency using the code loop the and phase-locked loop with a proper bandwidth.

The synchronizing and demodulating specifically can be: conducting the bit synchronizing, and demodulating the bit stream of the text data. The GPS satellite and the BD-2 GEO satellite are synchronized using the histogram. Since BD-2 MEO/IGSO has NH code, it is synchronized using the method of matched filtering, so as to transform the bit stream into the frame synchronization.

The observation extracting specifically can be: after the synchronizing and the demodulating are successful, decoding the navigation text to obtain the ephemeris and the almanac information. The position, the velocity information, and parameters of the satellite used for the navigation positioning solution are obtained from the ephemeris and the almanac.

The advantages of the implementations of the invention: the method of dividing a satellite signal into eight frequency points for processing according to the invention, divides the amplified satellite signal into radio frequency signals that include eight frequency points in total, i.e. GPSL1, GPSL2, GPSL5, BDB1, BDB2, BDB3, GLNL1, and GLNL2, by the power divider circuit. The five signals, i.e. GPSL2, GPSL5, BDB2, BDB3, and GLNL2, undergo the frequency mixing processing. The radio frequency signals that include eight frequency points in total, i.e. the five frequency-mixed signals including GPSL2, GPSL5, BDB2, BDB3, and GLNL2, and the three unmixed signals including GPSL1, BDB1, and GLNL1, are filtered. Finally, the filtered eight-frequency-point, signals are down converted and A/D converted, and then are output to the baseband portion for the baseband signal processing. The GPSL2, GPSL5, BDB2, BDB3, and GLNL2 are low-frequency signals, which are frequency-mixed using the low local oscillator circuit to obtain the signal of 1550 MHz~1611 MHz, and are frequency-balanced with the three signals, i.e. GPSL1, BDB1, and GLNL1. A plurality of frequency mixer circuits, a plurality of local oscillator circuits, and a plurality of input amplifier circuits are saved. The difficulty of realizing the eight-frequency-point satellite positioning receiver of three systems BD+GPS+GLONASS is significantly reduced. The power consumption is saved. The cost and the size of the hardware are cut down.

The descriptions above are merely the embodiments of the invention, but the protection scope of the invention is not limited thereto. Any changes or replacements that can be easily conceived by a person skilled in this art based on the technical disclosure of the invention, should all fall within the protection scope of the invention. Thus, the protection scope of the invention should be defined by the protection scope of the claims.

What is claimed is:

1. A method of dividing a satellite signal into eight frequency points for a baseband of a satellite navigation receiver, the method comprising the following steps:
    amplifying a satellite signal received by an antenna;
    dividing the amplified satellite signal into radio frequency signals that include eight frequency points in total, GPSL1, GPSL2, GPSL5, BDB1, BDB2, BDB3, GLNL1, and GLNL2, by a power divider circuit;
    conducting a frequency mixing processing on five signals GPSL2, GPSL5, BDB2, BDB3, and GLNL2 to obtain a signal of 1550 MHz~1611 MHz by a low local oscillator circuit, frequency-balancing the five signals GPSL2, GPSL5, BDB2, BDB3 and GLNL2 with three unmixed signals GPSL1, BDB1 and GLNL1, and filtering the radio frequency signals that include eight frequency points in total, which include five frequency-mixed signals, GPSL2, GPSL5, BDB2, BDB3, and GLNL2, and the three unmixed signals, GPSL1, BDB1, and GLNL1; and
    down-converting and A/D converting filtered eight-frequency-point radio frequency signals, and then outputting the signals to the baseband for baseband signal processing,
    wherein the steps are performed without a plurality of frequency mixer circuits and a plurality of input amplifier circuits.

2. The method of claim 1, wherein the baseband signal processing includes: capturing, tractioning, tracking, synchronizing and demodulating, and observation extracting, after reading a predefined value from a baseband.

3. The method of claim 2, wherein the capturing specifically is done by: fast capturing the satellite signal using a method based on matched filtering and FFT, so as to obtain a code phase and Doppler information under a predefined uncertainty.

4. The method of claim 3, wherein the tractioning specifically is done by: if the capturing is confirmed successfully, conducting a dynamic-range tractioning on the code phase and a carrier frequency.

5. The method of claim 4, wherein the tracing specifically is done by: after the tractioning is successful, and the phase-locking and the frequency-locking are conducted successfully, tracking the code phase and the carrier frequency.

6. The method of claim 5, wherein the synchronizing and the demodulating specifically is done by: conducting a bit synchronizing, and demodulating a bit stream of text data; wherein a GPS satellite and a BD-2 GEO satellite are synchronized; and wherein since a BD-2 MEO/IGSO has NH code, the BD-2 MEO/ISGO is synchronized using a method of matched filtering, so as to transform the bit stream into a frame synchronization.

7. The method of claim 6, wherein the observation extracting specifically is done by: after the synchronizing and the demodulating are successful, decoding a navigation text to obtain ephemeris and almanac information; and wherein a position, a velocity information, and parameters of a satellite used for a navigation positioning solution are obtained from the ephemeris and the almanac.

8. The method of claim 2, wherein a specific implementation of the conducting the frequency mixing processing on the five signals, GPSL2, GPSL5, BDB2, BDB3, and GLNL2, is done by outputting two carrier signals through a local oscillator circuit respectively, and dividing the two local oscillator signals into five signals to be frequency-mixed with the five signals including GPSL2, GPSL5, BDB2, BDB3, and GLNL2 by a frequency mixer.

9. The method of claim 3, wherein a specific implementation of the conducting the frequency mixing processing on the five signals, GPSL2, GPSL5, BDB2, BDB3, and GLNL2, is done by outputting two carrier signals through a local oscillator circuit respectively, and dividing the two local oscillator signals into five signals to be frequency-mixed with the five signals including GPSL2, GPSL5, BDB2, BDB3, and GLNL2 by a frequency mixer.

10. The method of claim 4, wherein a specific implementation of the conducting the frequency mixing processing on the five signals, GPSL2, GPSL5, BDB2, BDB3, and GLNL2, is done by outputting two carrier signals through a local oscillator circuit respectively, and dividing the two local oscillator signals into five signals to be frequency-mixed with the five signals including GPSL2, GPSL5, BDB2, BDB3, and GLNL2 by a frequency mixer.

11. The method of claim 5, wherein a specific implementation of the conducting the frequency mixing processing on the five signals, GPSL2, GPSL5, BDB2, BDB3, and GLNL2, is done by outputting two carrier signals through a local oscillator circuit respectively, and dividing the two local oscillator signals into five signals to be frequency-mixed with the five signals including GPSL2, GPSL5, BDB2, BDB3, and GLNL2 by a frequency mixer.

12. The method of claim 6, wherein a specific implementation of the conducting the frequency mixing processing on the five signals, GPSL2, GPSL5, BDB2, BDB3, and GLNL2, is done by outputting two carrier signals through a local oscillator circuit respectively, and dividing the two local oscillator signals into five signals to be frequency-mixed with the five signals including GPSL2, GPSL5, BDB2, BDB3, and GLNL2 by a frequency mixer.

13. The method of claim 7, wherein a specific implementation of the conducting the frequency mixing processing on the five signals, GPSL2, GPSL5, BDB2, BDB3, and GLNL2, is done by outputting two carrier signals through a local oscillator circuit respectively, and dividing the two local oscillator signals into five signals to be frequency-mixed with the five signals including GPSL2, GPSL5, BDB2, BDB3, and GLNL2 by a frequency mixer.

14. The method of claim 1, wherein the dividing the amplified satellite signal into radio frequency signals that includes eight frequency points in total, GPSL1, GPSL2, GPSL5, BDB1, BDB2, BDB3, GLNL1, and GLNL2, by the power divider circuit, specifically is: dividing the amplified satellite signals into radio frequency signals that include eight frequency points in total, GPSL1, GPSL2, GPSL5, BDB1, BDB2, BDB3, GLNL1, and GLNL2 through a first-stage power divider and a second-stage power divider.

15. The method of claim 14, wherein a specific implementation of the conducting the frequency mixing processing on the five signals, GPSL2, GPSL5, BDB2, BDB3, and GLNL2, is done by outputting, two carrier signals through a local oscillator circuit respectively, and dividing the two local oscillator signals into five signals to be frequency-mixed with the five signals including GPSL2, GPSL5, BDB2, BDB3, and GLNL2 by a frequency mixer.

16. The method of claim 1, wherein a specific implementation of the conducting the frequency mixing processing on the five signals, GPSL2, GPSL5, BDB2, BDB3, and GLNL2, is done by: outputting two carrier signals through a local oscillator circuit respectively, and dividing the two local oscillator signals into five signals to he frequency-mixed with the five signals including GPSL2, GPSL5, BDB2, BDB3, and GLNL2 by a frequency mixer.

17. The method of claim 16, wherein the down-converting and the A/D converting the filtered eight-frequency-point radio frequency signals specifically is done by: down-converting the filtered eight-frequency-point signals into frequency signals that are suitable for the baseband processing, and then conducting A/D conversion to quantize down-converted analog satellite signals into digital signals.

18. The method of claim 1, wherein the down-converting and the A/D converting the filtered eight-frequency-point radio frequency signals is done by down-converting the filtered eight-frequency-point signals into frequency signals that are suitable for the baseband processing, and then conducting A/D conversion to quantize down-converted analog satellite signals into digital signals.

* * * * *